United States Patent
Fukuchi et al.

(10) Patent No.: US 12,503,979 B2
(45) Date of Patent: Dec. 23, 2025

(54) ELECTRIC POWER SYSTEM AND MOVING OBJECT

(71) Applicant: HONDA MOTOR CO., LTD., Tokyo (JP)

(72) Inventors: Yuichi Fukuchi, Wako (JP); Takuya Kubota, Wako (JP); Hikari Hirayanagi, Wako (JP); Azuki Ichikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/609,694

(22) Filed: Mar. 19, 2024

(65) Prior Publication Data
US 2024/0318596 A1 Sep. 26, 2024

(30) Foreign Application Priority Data
Mar. 24, 2023 (JP) .................. 2023-047643

(51) Int. Cl.
| | | |
|---|---|---|
| *F02C 7/18* | (2006.01) | |
| *F02C 6/00* | (2006.01) | |
| *H02K 7/18* | (2006.01) | |
| *H02K 9/04* | (2006.01) | |
| *H02K 9/06* | (2006.01) | |

(52) U.S. Cl.
CPC .................. *F02C 7/18* (2013.01); *F02C 6/00* (2013.01); *F02C 7/185* (2013.01); *H02K 9/04* (2013.01); *H02K 9/06* (2013.01); *F05D 2220/76* (2013.01); *F05D 2260/205* (2013.01); *F05D 2260/232* (2013.01); *F05D 2260/234* (2013.01); *H02K 7/1823* (2013.01)

(58) Field of Classification Search
CPC .. F05D 2260/234; H02K 7/1823; H02K 9/04; H02K 9/06
See application file for complete search history.

(56) References Cited

U.S. PATENT DOCUMENTS

| | | | |
|---|---|---|---|
| 2013/0219854 A1* | 8/2013 | Alecu | F02K 3/115 60/39.83 |
| 2017/0138259 A1 | 5/2017 | Juretzek | |
| 2021/0324799 A1* | 10/2021 | Suzuki | B64D 33/08 |
| 2022/0325632 A1 | 10/2022 | Yazaki et al. | |
| 2023/0047728 A1* | 2/2023 | Yazaki | F01D 5/046 |

FOREIGN PATENT DOCUMENTS

| | | |
|---|---|---|
| JP | 2017-527728 A | 9/2017 |
| JP | 2022-157733 A | 10/2022 |

* cited by examiner

*Primary Examiner* — Scott J Walthour
(74) *Attorney, Agent, or Firm* — Rankin, Hill & Clark LLP

(57) ABSTRACT

An electric power system of a moving object includes a gas turbine engine including a compressor and a rotating electric machine connected to the gas turbine engine, a first bleed air flow path configured to introduce bleed air obtained by taking out a part of air compressed by the compressor into the rotating electric machine, and a second bleed air flow path configured to guide the bleed air introduced into the rotating electric machine to a component requiring cooling of the turbine engine.

12 Claims, 4 Drawing Sheets

ELECTRIC POWER SYSTEM AND MOVING OBJECT

CROSS-REFERENCE TO RELATED APPLICATIONS

This application is based upon and claims the benefit of priority from Japanese Patent Application No. 2023-047643 filed on Mar. 24, 2023, the contents of which are incorporated herein by reference.

BACKGROUND OF THE INVENTION

Field of the Invention

The present invention relates to an electric power system and a moving object.

Description of the Related Art

In recent years, research and development have been conducted on electric power systems that contribute to energy efficiency in order to ensure that more people have access to affordable, reliable, sustainable and modern energy.

JP 2017-527728 A discloses a gas turbine system in which air compressed by a compressor of a gas turbine engine is partially taken out as bleed air and then guided to a rotating electric machine connected to the gas turbine engine. The bleed air that has flowed through the rotating electric machine is discharged to the outside of the rotating electric machine and the gas turbine engine.

SUMMARY OF THE INVENTION

A gas turbine engine has a component requiring cooling for which cooling is necessary. An electric power system that is capable of cooling such a component requiring cooling with a simple configuration is required.

An object of the present invention is to solve the above-described problems.

An aspect of the present invention is to provide an electric power system including a gas turbine engine including a compressor and a component requiring cooling for which cooling is necessary, a rotating electric machine connected to the gas turbine engine, a first bleed air flow path configured to introduce bleed air obtained by taking out a part of air compressed by the compressor into the rotating electric machine, and a second bleed air flow path configured to guide the bleed air introduced into the rotating electric machine to the component requiring cooling.

Another aspect of the present invention is to provide a moving object including the electric power system described above.

According to the present invention, the component of the gas turbine engine that requires to be cooled can be cooled with a simple configuration.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
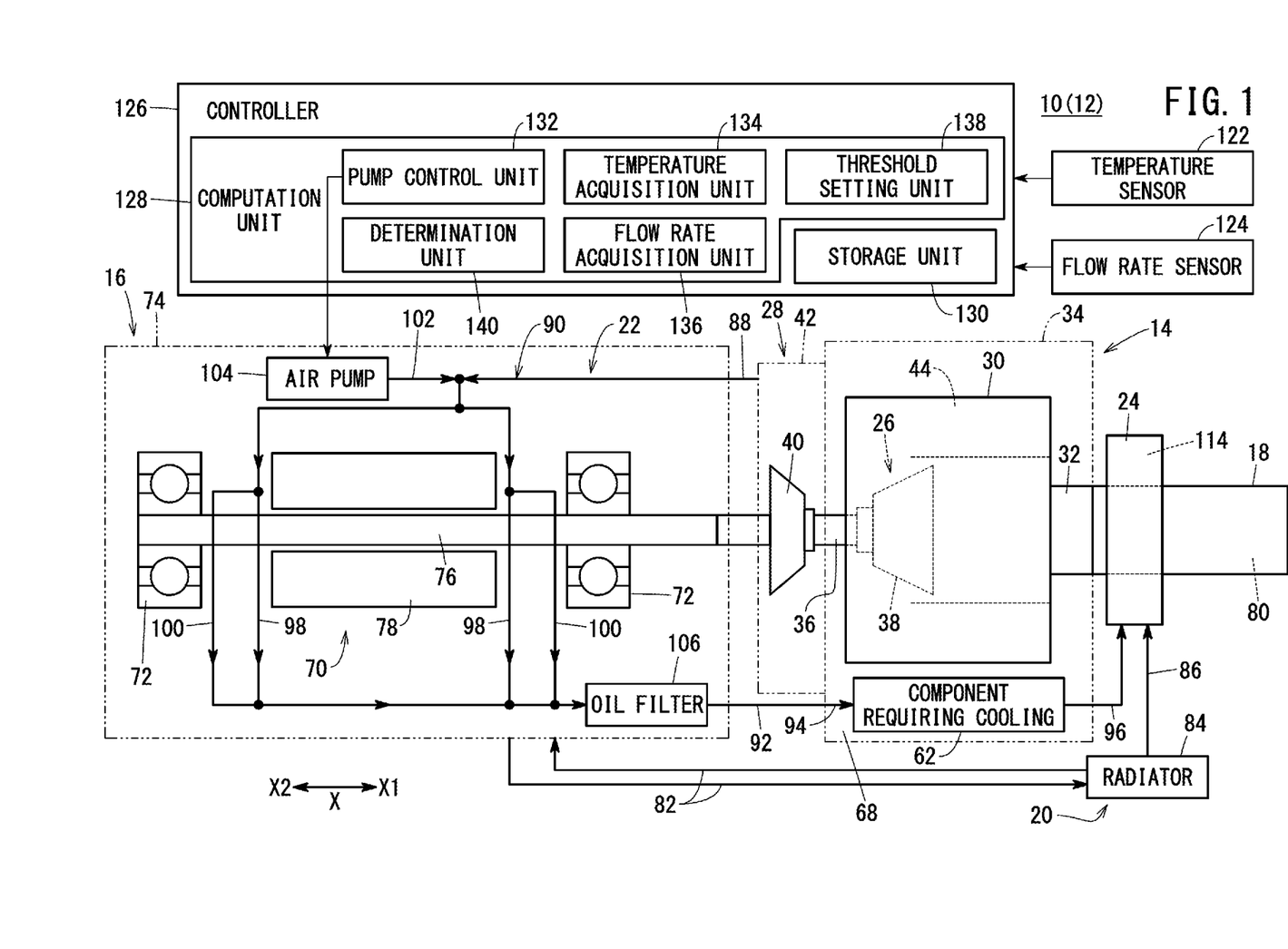
FIG. 1 is a schematic diagram of an electric power system (moving object) according to an embodiment of the present invention.

An electric power system 10 and a moving object 12 according to an embodiment of the present invention will be described below with reference to the drawings. As shown in FIG. 1, a moving object 12 according to the present embodiment is equipped with the electric power system 10. The moving object 12, for example, is an aircraft. More specifically, the moving object 12 is, for example, an electric vertical take-off and landing (eVTOL) aircraft. The moving object 12 may be an aircraft other than the electric vertical take-off and landing aircraft, or may be a ship, a vehicle, or the like. The electric power system 10 is not necessarily mounted on the moving object 12. The electric power system 10 may be provided in a stationary power generation apparatus.

The electric power system 10 includes a gas turbine engine 14, a rotating electric machine 16, an exhaust pipe 18, a cooling device 20, a bleed air flow path 22, and a mixing section 24. The gas turbine engine 14 generates a rotational driving force. The rotating electric machine 16 generates electric power by using the rotational driving force generated by the gas turbine engine 14. The electric power generated by the rotating electric machine 16 is charged in, for example, a battery (not shown) of the moving object 12. The electric power generated by the rotating electric machine 16 may be supplied to a load such as a motor for driving the moving object 12.

The gas turbine engine 14 includes a turbine section 26, a compressor 28, a combustor 30, a discharge pipe section 32, and a casing 34.

The turbine section 26 includes a turbine shaft 36 and a turbine wheel 38. The turbine shaft 36 extends in the arrow X direction. The turbine wheel 38 is fixed to the turbine shaft 36. The turbine wheel 38 is rotated by the combustion gas supplied from the combustor 30. The turbine wheel 38 discharges the exhaust gas in the arrow X1 direction.

The compressor 28 is adjacent to the turbine section 26 in the arrow X2 direction. The compressor 28 generates compressed air. The compressor 28 is, for example, a centrifugal compressor. The compressor 28 includes a compressor wheel 40 and a shroud case 42. The compressor wheel 40 is fixed to the turbine shaft 36. That is, the compressor wheel 40 and the turbine wheel 38 rotate integrally.

The shroud case 42 houses the compressor wheel 40. The shroud case 42 is provided with an air inlet (not shown) for allowing external air to flow into the shroud case 42. The air inside the shroud case 42 is compressed by the rotation of the compressor wheel 40. The compressor 28 supplies compressed air to the combustor 30.

The combustor 30 generates a combustion gas. The combustor 30 is formed in an annular shape. The combustor 30 covers the turbine section 26 from the radially outer side. The combustor 30 internally has an annular combustion chamber 44. The compressed air supplied from the compressor 28 is introduced into the combustion chamber 44.

Figure 3:
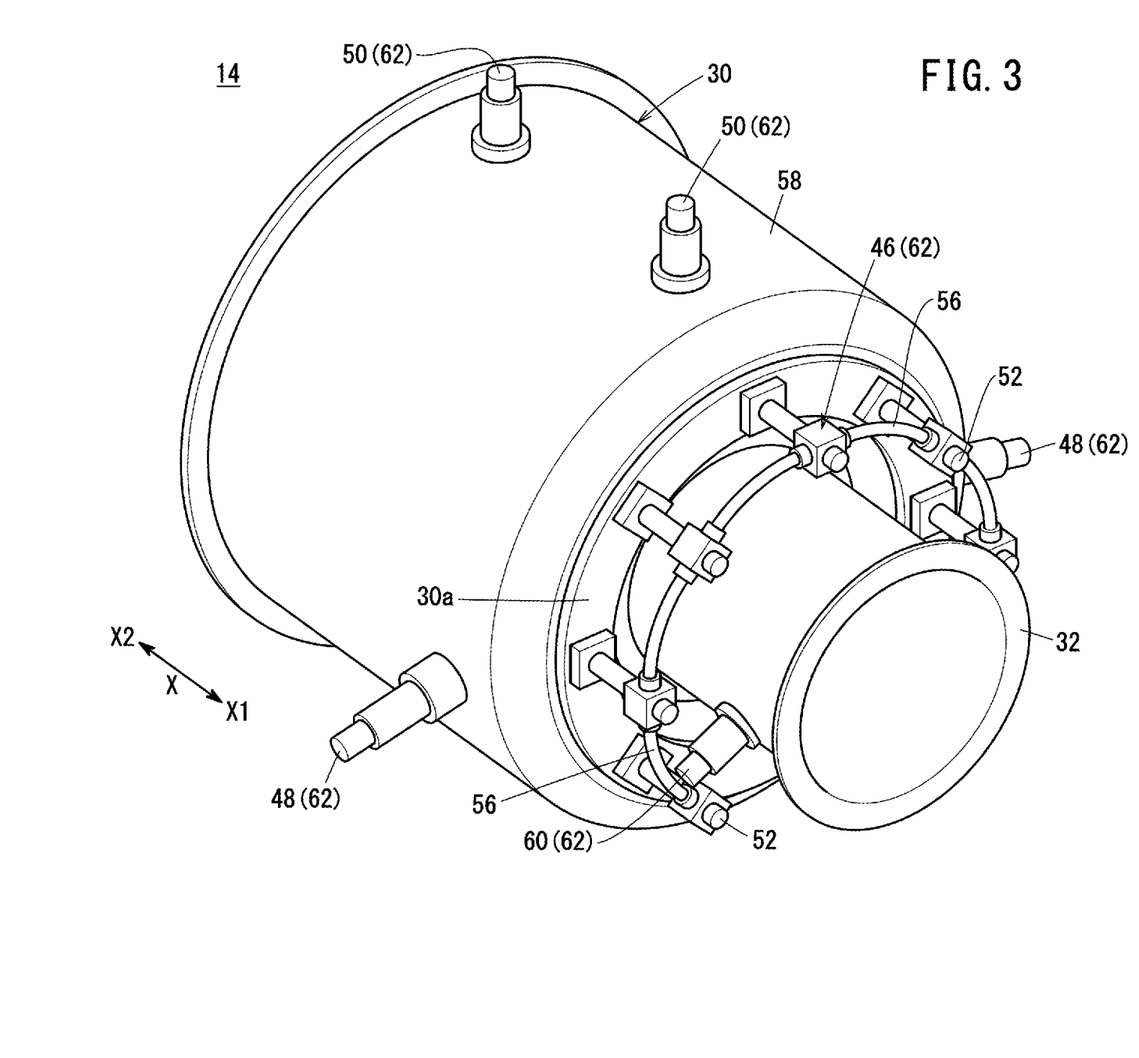
FIG. 3 is a perspective view of a combustor.

As shown in FIG. 3, the combustor 30 is provided with a fuel supply unit 46, two ignition devices 48, and a plurality of combustion temperature sensors 50. The fuel supply unit 46 includes a plurality of injectors 52 and a plurality of fuel pipes 56.

The injectors 52 inject fuel into the combustion chamber 44. The injectors 52 are attached to an end surface 30a of the combustor 30 on the side opposite to the compressor 28 (in the arrow X1 direction). Tip ends of the injectors 52 are positioned inside the combustion chamber 44. Base ends of the injectors 52 are positioned outside the combustor 30.

The plurality of injectors 52 are arranged at intervals along the circumferential direction of the combustor 30. The fuel pipes 56 connect the adjacent base ends of the injectors 52. The fuel is supplied from a fuel supply source (not shown) to the injectors 52 through the fuel pipes 56.

The ignition devices 48 are igniters that initiate the discharge in the combustion chamber 44. The ignition devices 48 ignite the fuel in the combustion chamber 44 at the time of starting the gas turbine engine 14. The ignition devices 48 are mounted to an outer wall 58 of the combustor 30. The ignition devices 48 are partially positioned outside the combustor 30. The number of the ignition devices 48 may be set as appropriate. In the combustion chamber 44, combustion gas is generated by combustion of the fuel. The combustor 30 guides the combustion gas generated in the combustion chamber 44 to the turbine section 26. The combustor 30 becomes higher in temperature than other components (such as the rotating electric machine 16 and the like) due to the generation of the combustion gas.

The combustion temperature sensors 50 detect the temperature of the combustion gas in the combustion chamber 44. The combustion temperature sensors 50 are attached to the outer wall 58 of the combustor 30. Each of the combustion temperature sensors 50 is partially positioned outside the combustor 30. The number of combustion temperature sensors 50 may be set as appropriate.

The discharge pipe section 32 protrudes from the combustor 30 in the arrow X1 direction. The exhaust gas from the turbine wheel 38 is guided to the exhaust pipe 18 through the discharge pipe section 32 (see FIG. 1). An exhaust temperature sensor 60 for detecting the temperature of the exhaust gas is attached to the discharge pipe section 32. The exhaust temperature sensor 60 is partially positioned outside the discharge pipe section 32.

The fuel supply unit 46, the ignition devices 48, the combustion temperature sensors 50, and the exhaust temperature sensor 60 receive heat generated in the combustor 30. The fuel supply unit 46, the ignition devices 48, the combustion temperature sensors 50, and the exhaust temperature sensor 60 are the components requiring cooling 62 for which cooling is necessary. The components requiring cooling 62 are not limited to the exemplified components shown here, and may include components other than those, or may not include at least one of the exemplified components.

Figure 2:
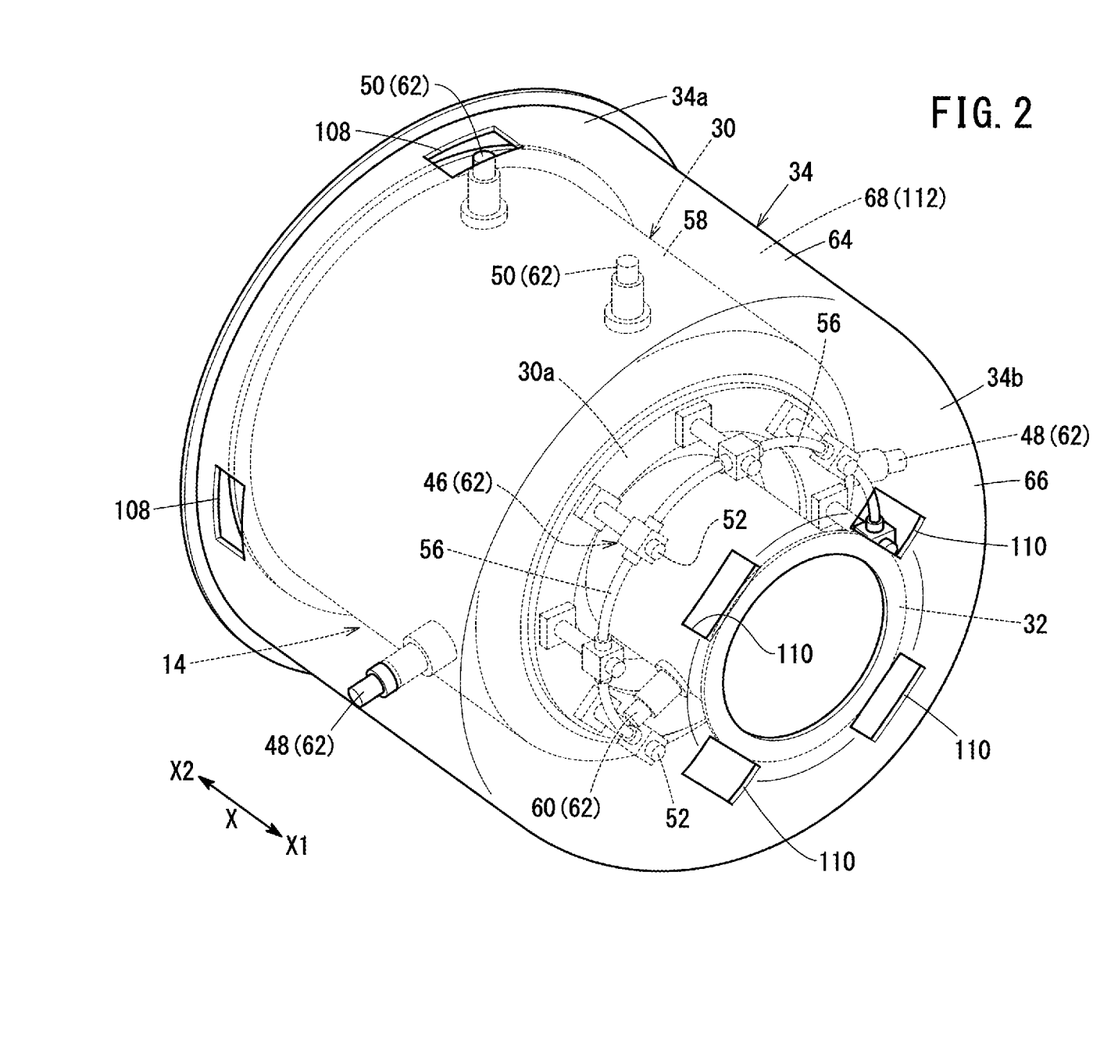
FIG. 2 is a perspective view, with partial omission, of a gas turbine engine.

As shown in FIGS. 1 and 2, the casing 34 houses the turbine section 26, the combustor 30, and the discharge pipe section 32. As shown in FIG. 2, the casing 34 is formed in an annular shape. The casing 34 has a first end portion 34a and a second end portion 34b in the axial direction of the gas turbine engine 14. The first end portion 34a is positioned on the rotating electric machine 16 side.

The casing 34 includes an annular peripheral wall 64 and an end wall 66. The peripheral wall 64 covers the outer wall 58 of the combustor 30 from the radially outer side of the turbine shaft 36. The peripheral wall 64 of the casing 34 and the outer wall 58 of the combustor 30 are spaced apart from each other. The end wall 66 covers an end surface 30a of the combustor 30 from the arrow X1 direction.

The end wall 66 is positioned at the second end portion 34b of the casing 34. The end wall 66 and the end surface 30a of the combustor 30 are spaced from each other. An inner peripheral end of the end wall 66 is connected to the discharge pipe section 32. A chamber 68 for housing the components requiring cooling 62 is formed inside the casing 34.

As shown in FIG. 1, the rotating electric machine 16 is connected to the gas turbine engine 14. The rotating electric machine 16 functions as, for example, a motor for rotating the compressor wheel 40, for example, at the time of starting the gas turbine engine 14. The rotating electric machine 16 functions as, for example, an electric power generator that generates electric power by the rotational driving force of the turbine wheel 38.

The rotating electric machine 16 is adjacent to the compressor 28 opposite to the combustor 30 side (in the arrow X2 direction). The rotating electric machine 16 includes a rotating electric machine body 70, bearings 72, and a housing 74. The rotating electric machine body 70 includes a rotor 76 and a stator 78.

The rotor 76 is coupled to the turbine shaft 36 (at an end in the arrow X2 direction). The rotor 76 rotates integrally with the turbine shaft 36. The bearings 72 rotatably support the rotor 76. The bearings 72 are disposed on both sides of the rotating electric machine body 70. The bearings 72 are, for example, rolling bearings. The bearings 72 may be sliding bearings. Lubricating oil is supplied to the bearings 72. The housing 74 accommodates the rotating electric machine body 70 and the bearings 72.

The exhaust pipe 18 is connected to the discharge pipe section 32 of the gas turbine engine 14. The exhaust pipe 18 extends from the discharge pipe section 32 in the arrow X1 direction. The exhaust pipe 18 has an exhaust passage 80 therein. The exhaust passage 80 increases in diameter toward the downstream side. That is, the exhaust pipe 18 is a diffuser.

The cooling device 20 serves to cool the rotating electric machine 16. The cooling device 20 includes a cooling medium circuit 82, a radiator 84, and a cooling air flow path 86. A cooling medium flows through the cooling medium circuit 82. The cooling medium in the cooling medium circuit 82 is made to flow by a pump (not shown). The cooling medium circuit 82 is partially provided inside the rotating electric machine 16.

The radiator 84 is connected to the cooling medium circuit 82. The radiator 84 performs heat exchange between the cooling medium flowing through the cooling medium circuit 82 and external air (cooling air). That is, the radiator 84 takes the heat from the cooling medium using the cooling air. The cooling air after heat exchange at the radiator 84 is guided to the mixing section 24 through the cooling air flow path 86.

The cooling air flow path 86 communicates with the exhaust passage 80 via the mixing section 24. The cooling air is sucked by the exhaust passage 80 functioning as the diffuser. The cooling device 20 may include a fan or the like that moves the cooling air from the radiator 84 toward the mixing section 24.

The bleed air obtained by partially taking out the air compressed by the compressor 28 is guided through the bleed air flow path 22 to the mixing section 24 via the components requiring cooling 62 in the rotating electric machine 16 and the gas turbine engine 14. The bleed air flow path 22 includes a first bleed air flow path 88, a first intermediate flow path 90, a second bleed air flow path 92, a second intermediate flow path 94, and a bleed air lead-out flow path 96.

The first bleed air flow path 88 connects the shroud case 42 of the compressor 28 and the housing 74 of the rotating electric machine 16. The first bleed air flow path 88 guides the bleed air from the compressor 28 to the rotating electric machine 16.

The first intermediate flow path 90 is provided in the housing 74 of the rotating electric machine 16. The first intermediate flow path 90 communicates with the first bleed air flow path 88 and the second bleed air flow path 92. The first intermediate flow path 90 includes first cooling flow paths 98 and sealing channels 100.

The first cooling flow paths 98 are provided in the rotating electric machine body 70. The bleed air flowing through the first cooling flow paths 98 cools the rotating electric machine body 70. The sealing channels 100 are positioned between the rotating electric machine body 70 and the bearings 72. The bleed air flowing through the sealing channels 100 prevents the lubricating oil supplied to the bearings 72 from entering the rotating electric machine body 70. The bleed air flowing through the first intermediate flow path 90 may cool the cooling medium of the cooling medium circuit 82.

An air introduction flow path 102 is provided on the upstream side of the first cooling flow paths 98 in the first intermediate flow path 90. An air pump 104 is provided in the air introduction flow path 102. The air pump 104 supplies air to the first intermediate flow path 90 via the air introduction flow path 102. An oil filter 106 is provided on the downstream side of the sealing channels 100 in the first intermediate flow path 90. The oil filter 106 removes the lubricating oil from the bleed air.

The second bleed air flow path 92 connects the housing 74 of the rotating electric machine 16 and the casing 34 of the gas turbine engine 14. The bleed air that has flowed through the first intermediate flow path 90 is guided through the second bleed air flow path 92 to the chamber 68 inside the casing 34.

The second intermediate flow path 94 is provided in the casing 34 of the gas turbine engine 14. As shown in FIG. 2, the second intermediate flow path 94 includes a plurality of first openings 108, a plurality of second openings 110, and a second cooling flow path 112.

The first openings 108 allow the second bleed air flow path 92 and the housing chamber 68 to communicate with each other. The bleed air is introduced into the chamber 68 of the casing 34 through the first openings 108. In the present embodiment, the second intermediate flow path 94 includes four first openings 108. The first openings 108 are provided at the first end portion 34a of the casing 34. In other words, the first openings 108 are provided in the peripheral wall 64 of the casing 34.

The plurality of first openings 108 are disposed at intervals in the circumferential direction of the casing 34. To be specific, the plurality of first openings 108 are arranged at equal intervals in the circumferential direction of the casing 34. The first openings 108 are quadrangular holes.

The bleed air in the second cooling flow path 112 is guided to the bleed air lead-out flow path 96 through the second openings 110. In the present embodiment, the second intermediate flow path 94 includes four second openings 110. The second openings 110 are provided at the second end portion 34b of the casing 34. In other words, the second openings 110 are provided on the end wall 66 of the casing 34.

The second openings 110 and the fuel supply unit 46 face each other. The plurality of second openings 110 are disposed at intervals in the circumferential direction of the casing 34. To be specific, the plurality of second openings 110 are arranged at equal intervals in the circumferential direction of the casing 34. The second openings 110 are quadrangular holes. The plurality of first openings 108 and the plurality of second openings 110 are arranged so that the positions thereof in the circumferential direction of the casing 34 are shifted from each other.

The bleed air flows from the first openings 108 toward the second openings 110 through the second cooling flow path 112. The second cooling flow path 112 is provided in the chamber 68 of the casing 34. The shape, size, number, and position of the first openings 108 and the second openings 110 can be appropriately set.

As shown in FIG. 1, the bleed air led out from the second openings 110 is guided to the mixing section 24 through the bleed air lead-out flow path 96.

The mixing section 24 is connected to an exhaust pipe 18. The mixing section 24 is a cylindrical portion that covers the exhaust pipe 18 from the outside. The mixing section 24 has a mixing chamber 114 around the exhaust pipe 18. In the mixing section 24, the bleed air guided from the bleed air lead-out flow path 96 and the cooling air guided from the cooling air flow path 86 are mixed in the mixing chamber 114.

Mixed air obtained by mixing the bleed air and the cooling air is introduced into the exhaust passage 80 from the mixing section 24. The mixed air is mixed with the exhaust gas discharged from the turbine wheel 38 in the exhaust passage 80, and flows therethrough as gas mixture.

The electric power system 10 further includes a temperature sensor 122, a flow rate sensor 124, and a controller 126. The temperature sensor 122 detects a temperature Ta of the chamber 68 of the gas turbine engine 14. The flow rate sensor 124 detects a flow rate Qa of the gas mixture flowing through the exhaust passage 80.

The controller 126 includes a computation unit 128 and a storage unit 130. The computation unit 128 can be constituted by a processor, i.e., a processing circuitry such as a CPU (Central Processing Unit), a GPU (Graphics Processing Unit), or the like.

The computation unit 128 includes a pump control unit 132, a temperature acquisition unit 134, a flow rate acquisition unit 136, a threshold setting unit 138, and a determination unit 140. The pump control unit 132, the temperature acquisition unit 134, the flow rate acquisition unit 136, the threshold setting unit 138, and the determination unit 140 can be realized by the computation unit 128 executing a program stored in the storage unit 130.

At least a portion of the pump control unit 132, the temperature acquisition unit 134, the flow rate acquisition unit 136, the threshold setting unit 138, and the determination unit 140 may be realized by an integrated circuit such as an ASIC (Application Specific Integrated Circuit) or an FPGA (Field-Programmable Gate Array) or the like. Further, at least a portion of the pump control unit 132, the temperature acquisition unit 134, the flow rate acquisition unit 136, the threshold setting unit 138, and the determination unit 140 may be constituted by an electronic circuit including a discrete device.

The storage unit 130 may be made up of a volatile memory (not shown), and a non-volatile memory (not shown). As the volatile memory, there may be cited, for example, a RAM (Random Access Memory). Such a volatile memory is used as a working memory of the processor, and temporarily stores data necessary for performing processing or calculations. As the nonvolatile memory, there may be cited, for example, a ROM (Read Only Memory), a flash memory, or the like. The nonvolatile memory is used as a storage memory, and stores programs, tables, maps, and the like. At least part of the storage unit 130 may be provided in the processor, the integrated circuit, etc. as described above.

The pump control unit 132 controls the operation of the air pump 104. The pump control unit 132 sends control signals to the air pump 104 as appropriate. The pump control unit 132 drives the air pump 104 to supply air to the air introduction flow path 102.

The temperature acquisition unit 134 acquires a temperature (temperature Ta) from the temperature sensor 122. The flow rate acquisition unit 136 acquires a flow rate (flow rate Qa) from the flow rate sensor 124.

The threshold setting unit 138 sets a flow rate threshold Qb. When the air pump 104 is driven, the flow rate of the bleed air guided to the mixing section 24 increases. Then, the flow rate of the mixed air obtained by mixing the bleed air and the cooling air increases. When the flow rate of the mixed air increases, the flow rate of the gas mixture of the exhaust gas and the mixed air increases.

When the flow rate of the gas mixture becomes excessively high, the exhaust gas cannot be smoothly discharged from the turbine wheel 38, and thus the gas turbine engine 14 may stop (stall). The threshold setting unit 138 sets a flow rate threshold Qb lower than the flow rate of the gas mixture at which the gas turbine engine 14 stops. The threshold setting unit 138 sets the flow rate threshold Qb based on various parameters such as the number of rotations of the turbine shaft 36, for example.

The determination unit 140 determines whether the temperature Ta acquired by the temperature acquisition unit 134 is higher than a predetermined temperature threshold Tb. The determination unit 140 determines whether or not the flow rate Qa acquired by the flow rate acquisition unit 136 is equal to or greater than the flow rate threshold Qb set by the threshold value setting unit 138.

The temperature threshold Tb is determined in advance and stored in the storage unit 130. The temperature threshold Tb is set to be equal to or lower than a temperature at which a failure may occur in the components requiring cooling 62 due to the heat from the combustor 30. Specifically, the temperature threshold Tb is set to, for example, a temperature equal to or lower than the temperature at which the fuel in the fuel supply unit 46 is carbonized.

Next, the operation of the electric power system 10 will be described. When the gas turbine engine 14 is driven, external air is taken into the shroud case 42 and compressed by the compressor wheel 40. The air compressed by the compressor wheel 40 is guided to a combustion chamber 44 of the combustor 30. The combustor 30 causes the fuel injected from the fuel supply unit 46 into the combustion chamber 44 to undergo combustion, thereby generating combustion gas. The combustion gas rotates the turbine wheel 38.

The rotational driving force of the turbine wheel 38 is transmitted to the rotor 76 of the rotating electric machine 16 through the turbine shaft 36. Thus, the rotating electric machine 16 generates electric power. The rotating electric machine 16 is cooled by the cooling device 20. The exhaust gas (combustion exhaust gas) of the turbine wheel 38 is guided to the exhaust passage 80.

In the present embodiment, a portion of the air compressed by the compressor wheel 40 is taken out and guided to the first bleed air flow path 88. The bleed air taken out and guided to the first bleed air flow path 88 is introduced into the first intermediate flow path 90 provided in the housing 74 of the rotating electric machine 16.

The bleed air introduced into the first intermediate flow path 90 flows into the first cooling flow paths 98 and the sealing channels 100. The bleed air flowing through the first cooling flow paths 98 cool the rotating electric machine body 70. The bleed air flowing through the sealing channels 100 prevents the entry of the lubricating oil from the bearings 72 into the rotating electric machine body 70. The bleed air that has flowed through the first cooling flow paths 98 and the bleed air that has flowed through the sealing channels 100 join together and then flow through the oil filter 106. By the oil filter 106, the lubricating oil in the bleed air is removed. The bleed air from which the lubricating oil has been removed by the oil filter 106 is guided to the second intermediate flow path 94 via the second bleed air flow path 92.

To be more specific, the bleed air having flowed through the second bleed air flow path 92 flows into the chamber 68 (second cooling flow path 112) of the gas turbine engine 14 from the plurality of first openings 108. The bleed air flows through the second cooling flow path 112 toward the second openings 110 while spreading in the circumferential direction of the casing 34. The bleed air flowing through the second cooling flow path 112 cools the components requiring cooling 62. After cooling the components requiring cooling 62, the bleed air is led out from the second openings 110 to the bleed air lead-out flow path 96. The bleed air led out to the bleed air lead-out flow path 96 is guided to the mixing section 24.

The bleed air guided to the mixing section 24 is mixed with the cooling air guided from the cooling device 20. The mixed air obtained by mixing the bleed air and the cooling air is introduced into the exhaust passage 80 and mixed with the exhaust gas.

Figure 4:
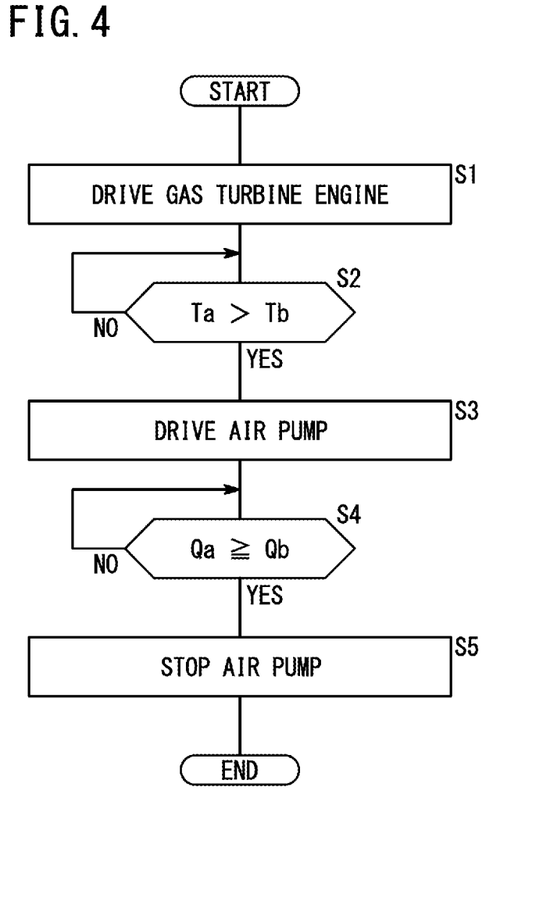
FIG. 4 is a flowchart showing air pump control.

Next, a description will be given concerning the control of the air pump 104. As shown in FIG. 4, when the gas turbine engine 14 is driven in step S1, the determination unit 140 determines in step S2 whether the temperature Ta of the chamber 68 is higher than the temperature threshold Tb. If the temperature Ta is higher than the temperature threshold Tb (step S2: YES), the process proceeds to step S3. If the temperature Ta is equal to or lower than the temperature threshold Tb, the step S2 is repeated.

In step S3, the pump control unit 132 drives the air pump 104. When the air pump 104 is driven, air is supplied from the air pump 104 to the first intermediate flow path 90 via the air introduction flow path 102. Then, the flow rate of the bleed air increases, and thus the components requiring cooling 62 can be efficiently cooled. After step S3, the process proceeds to step S4.

In step S4, the determination unit 140 determines whether or not the flow rate Qa of the gas mixture is equal to or higher than the flow rate threshold Qb. If the flow rate Qa is equal to or higher than the flow rate threshold Qb (step S4: YES), the process proceeds to step S5. If the flow rate Qa is less than the flow rate threshold Qb, step S4 is repeated.

In step S5, the pump control unit 132 stops the air pump 104. Thus, the flow rate of the gas mixture is prevented from becoming excessively high, and therefore, the gas turbine engine 14 is prevented from stalling.

The present embodiment is not limited to the above-described configuration. The air pump 104 may be provided in the rotating electric machine 16 such that air is supplied to the first intermediate flow path 90 at a position downstream of the first cooling flow paths 98 and the sealing channels 100. The oil filter 106 may be provided in the second bleed air flow path 92.

The pump control unit 132 may drive the air pump 104 based on the flow rate of the bleed air flowing through the bleed air flow path 22. In this case, for example, a flow rate sensor that detects the flow rate of the bleed air may be provided at a joint portion between the first intermediate flow path 90 and the air introduction flow path 102. Specifically, the pump control unit 132 drives the air pump 104 when the flow rate of the bleed air detected by the flow rate sensor is equal to or less than a predetermined flow rate threshold. The flow rate threshold is set to, for example, a lower limit value of the flow rate of the bleed air at which the lubricating oil can be sealed by the bleed air flowing through the sealing channels 100. Thus, the entry of the lubricating oil from the bearings 72 into the rotating electric machine body 70 can be further suppressed by the bleed air.

In the electric power system 10, in the case where the temperatures of the components requiring cooling 62 rise again immediately after the gas turbine engine 14 stops by the heat from high-temperature portions inside the combustor 30 through heat conduction, convection, and the like, the compressor 28 may be driven by the rotating electric machine 16 to supply the bleed air to the components requiring cooling 62. In this case, the size of the air pump 104 can be minimized.

In addition to the above disclosure, the following supplemental notes are further disclosed.

Supplementary Note 1

The electric power system (10) including the gas turbine engine (14) including the compressor (28) and the component requiring cooling (62) for which cooling is necessary, the rotating electric machine (16) connected to the gas turbine engine, the first bleed air flow path (88) configured to introduce bleed air obtained by taking out a part of air compressed by the compressor into the rotating electric machine, and the second bleed air flow path (92) configured to guide the bleed air introduced into the rotating electric machine to the component requiring cooling (62).

According to such a configuration, the component requiring cooling can be efficiently cooled by the bleed air guided from the compressor to the rotating electric machine. Thus, since it is not necessary to separately provide a device for cooling the component requiring cooling, the electric power system can be simplified in configuration.

Supplementary Note 2

The electric power system according to Supplementary Note 1 may further include the exhaust passage (80) to which exhaust gas from the gas turbine engine is discharged, and the bleed air lead-out flow path (96) configured to allow the bleed air guided to the component requiring cooling to flow toward the exhaust passage.

According to such a configuration, the bleed air is discharged to the exhaust passage, and thus smooth flow of the bleed air can be facilitated.

Supplementary Note 3

The electric power system according to the Supplementary Note 2 may further include the radiator (84) for taking heat from a cooling medium for cooling the rotating electric machine, the cooling air flow path (86) configured to allow cooling air having cooled the radiator to flow toward the exhaust passage, and the mixing section (24) in which the bleed air and the cooling air are mixed with each other, wherein mixed air obtained by mixing the bleed air and the cooling air may be introduced into the exhaust passage from the mixing section.

According to such a configuration, it is possible to efficiently cool the rotating electric machine. Further, since the mixed air obtained by mixing the bleed air and the cooling air is introduced into the exhaust passage, the mixed air and the exhaust gas are easily mixed uniformly. Therefore, the exhaust gas can be smoothly discharged to the exhaust passage.

Supplementary Note 4

In the electric power system according to any one of the Supplementary Notes 1 to 3, the rotating electric machine may include: the rotating electric machine body (70) and the housing (74) that houses the rotating electric machine body, inside the housing, the intermediate flow path (90) in communication with the first bleed air flow path and the second bleed air flow path may be provided, and inside the rotating electric machine, the air pump (104) for sending air to the intermediate flow path may be provided.

According to such a configuration, the flow rate of the bleed air flowing through the intermediate flow path can be adjusted by the air pump. In this manner, it becomes possible to efficiently cool the component requiring cooling.

Supplementary Note 5

In the electric power system according to Supplementary Note 4, the gas turbine engine may include the chamber (68) housing the component requiring cooling, the electric power system may include the pump control unit (132) configured to control an operation of the air pump and a temperature acquisition unit (134) configured to acquire a temperature inside the chamber, and the pump control unit may drive the air pump in a case where a temperature (Ta) acquired by the temperature acquisition unit is higher than a predetermined temperature threshold (Tb).

According to such a configuration, the component requiring cooling can be cooled more efficiently.

Supplementary Note 6

The electric power system according to Supplementary Note 5 may further include an exhaust passage to which exhaust gas from the gas turbine engine is discharged, and a bleed air lead-out flow path configured to allow the bleed air guided to the component requiring cooling to flow toward the exhaust passage, and the pump control unit may stop the air pump in a case where a flow rate (Qa) of a gas mixture of the exhaust gas and the bleed air becomes equal to or higher than a flow rate threshold (Qb).

According to such a configuration, it is possible to prevent the gas turbine engine from stalling due to a large amount of bleed air being guided to the exhaust passage.

Supplementary Note 7

The electric power system according to any one of the Supplementary Notes 1 to 6 may further include the oil filter (106) for preventing a lubricating oil of the rotating electric machine from being guided to the component requiring cooling together with the bleed air.

According to such a configuration, it is possible to suppress the lubricating oil from adhering to the component requiring cooling.

Supplementary Note 8

In the electric power system according to any one of the Supplementary Notes 1 to 7, the gas turbine engine may include the combustor (30) and the annular casing (34) covering the combustor, and the component requiring cooling may be housed in a chamber inside the casing.

According to such a configuration, the component requiring cooling arranged around the combustor can be cooled.

Supplementary Note 9

In the electric power system according to Supplementary Note 8, the casing has the first end portion (34*a*) and the second end portion (34*b*) in an axial direction of the gas turbine engine, the first end portion is positioned between the second end portion and the rotating electric machine, the first opening (108) configured to introduce the bleed air into the chamber may be provided at the first end portion, and the second opening (110) configured to guide the bleed air to an outside of the casing may be provided at the second end portion.

According to such a configuration, the gas turbine engine can be made simple in configuration, and the bleed air can smoothly get around the chamber.

Supplementary Note 10

In the electric power system according to Supplementary Note 9, a plurality of the first openings may be provided at intervals in a circumferential direction of the casing, and a plurality of the second openings may be provided at intervals in the circumferential direction of the casing.

According to such a configuration, it is possible to suppress the temperature variation in the chamber in the circumferential direction of the casing.

Supplementary Note 11

In the electric power system according to Supplementary Note 10, the first openings and the second openings may be arranged so as to be shifted from each other in a circumferential direction of the casing.

According to such a configuration, it is possible to further suppress the temperature variation in the chamber in the circumferential direction of the casing.

Supplementary Note 12

In the electric power system according to any one of Supplementary Notes 1 to 11, the component requiring cooling may include at least one of the fuel supply unit (46) through which a fuel is supplied into a combustor of the gas turbine engine, the ignition device (48) configured to ignite the fuel in the combustor, the combustion temperature sensor (50) configured to detect a temperature of combustion gas inside the combustor, and the exhaust temperature sensor (60) configured to detect a temperature of the exhaust gas from the gas turbine engine.

According to such a configuration, it is possible to prevent at least one of the fuel supply unit, the ignition device, the combustion temperature sensor, and the exhaust temperature sensor from malfunctioning due to heat generated in the combustor.

Supplementary Note 13

The moving object (12) includes the electric power system according to any one of Supplementary Notes 1 to 12.

Moreover, it should be noted that the present invention is not limited to the embodiments described above, but a variety of configurations may be adopted therein without departing from the essence and gist of the present invention.

The invention claimed is:

1. An electric power system comprising:
a gas turbine engine including a compressor and a component requiring cooling;
a rotating electric machine connected to the gas turbine engine;
a first bleed air flow path configured to introduce bleed air obtained by taking out a part of air compressed by the compressor into the rotating electric machine;
a second bleed air flow path configured to guide the bleed air introduced into the rotating electric machine to the component requiring cooling;
an exhaust passage to which exhaust gas from the gas turbine engine is discharged;
a bleed air lead-out flow path configured to allow the bleed air guided to the component requiring cooling to flow toward the exhaust passage;
a radiator for taking heat from a cooling medium for cooling the rotating electric machine;
a cooling air flow path configured to allow cooling air having cooled the radiator to flow toward the exhaust passage; and
a mixing section in which the bleed air and the cooling air are mixed with each other,
wherein mixed air obtained by mixing the bleed air and the cooling air is introduced into the exhaust passage from the mixing section.

2. The electric power system according to claim 1, further comprising:
an oil filter for preventing a lubricating oil of the rotating electric machine from being guided to the component requiring cooling together with the bleed air.

3. The electric power system according to claim 1, wherein the gas turbine engine comprises:
a combustor; and
an annular casing covering the combustor, and
wherein the component requiring cooling is housed in a chamber inside the annular casing.

4. The electric power system according to claim 3, wherein the annular casing has a first end portion and a second end portion in an axial direction of the gas turbine engine;
wherein the first end portion is positioned between the second end portion and the rotating electric machine,
a first opening configured to introduce the bleed air into the chamber is provided at the first end portion, and
a second opening configured to guide the bleed air to an outside of the annular casing is provided at the second end portion.

5. The electric power system according to claim 4, wherein
a plurality of the first openings are provided at intervals in a circumferential direction of the annular casing, and
a plurality of the second openings are provided at intervals in the circumferential direction of the annular casing.

6. The electric power system according to claim 5, wherein the plurality of first openings and the plurality of second openings are arranged so as to be shifted from each other in the circumferential direction of the annular casing.

7. A moving object comprising the electric power system according to claim 1.

8. The electric power system according to claim 1, wherein the mixed air is mixed with the exhaust gas in the exhaust passage.

9. An electric power system comprising:
a gas turbine engine including a compressor and a component requiring cooling;
a rotating electric machine connected to the gas turbine engine;
a first bleed air flow path configured to introduce bleed air obtained by taking out a part of air compressed by the compressor into the rotating electric machine;
a second bleed air flow path configured to guide the bleed air introduced into the rotating electric machine to the component requiring cooling;
an exhaust passage to which exhaust gas from the gas turbine engine is discharged; and
a bleed air lead-out flow path configured to allow the bleed air guided to the component requiring cooling to flow toward the exhaust passage,
wherein the rotating electric machine comprises:
a rotating electric machine body; and
a housing that houses the rotating electric machine body, inside the housing, an intermediate flow path in communication with the first bleed air flow path and the second bleed air flow path is provided, and
inside the rotating electric machine, an air pump for sending air to the intermediate flow path is provided.

10. The electric power system according to claim 9,
wherein the gas turbine engine comprises a chamber housing the component requiring cooling, and
wherein the electric power system further comprises:
one or more processors and a memory that stores computer-executable instructions, the one or more processors configured to execute the computer-executable instructions stored in the memory to cause the electric power system to:
control an operation of the air pump;
acquire a temperature inside the chamber; and
in controlling the operation of the air pump, drive the air pump in a case where the temperature acquired by the electric power system is higher than a predetermined temperature threshold.

11. The electric power system according to claim 10,
wherein in controlling the operation of the air pump, the one or more processors cause the electric power system to stop the air pump in a case where a flow rate of a gas mixture of the exhaust gas and the bleed air becomes equal to or higher than a flow rate threshold.

12. An electric power system comprising:
a gas turbine engine including a compressor and a component requiring cooling;
a rotating electric machine connected to the gas turbine engine;
a first bleed air flow path configured to introduce bleed air obtained by taking out a part of air compressed by the compressor into the rotating electric machine;
a second bleed air flow path configured to guide the bleed air introduced into the rotating electric machine to the component requiring cooling;
an exhaust passage to which exhaust gas from the gas turbine engine is discharged; and
a bleed air lead-out flow path configured to allow the bleed air guided to the component requiring cooling to flow toward the exhaust passage,
wherein the component requiring cooling is at least one of:
a fuel supply unit configured to supply a fuel into a combustor of the gas turbine engine;
an ignition device configured to ignite the fuel in the combustor;
a combustion temperature sensor configured to detect a temperature of combustion gas inside the combustor; or p2 an exhaust temperature sensor configured to detect a temperature of exhaust gas from the gas turbine engine.

* * * * *